(12) United States Patent
Teranishi (10) Patent No.: US 10,566,650 B2
(45) Date of Patent: Feb. 18, 2020

(54) LITHIUM ION SECONDARY BATTERY

(71) Applicant: SEKISUI CHEMICAL CO., LTD., Osaka-shi, Osaka (JP)

(72) Inventor: Rie Teranishi, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/751,402

(22) PCT Filed: Oct. 5, 2016

(86) PCT No.: PCT/JP2016/079618
§ 371 (c)(1),
(2) Date: Feb. 8, 2018

(87) PCT Pub. No.: WO2017/061468
PCT Pub. Date: Apr. 13, 2017

(65) Prior Publication Data
US 2018/0233773 A1 Aug. 16, 2018

(30) Foreign Application Priority Data
Oct. 5, 2015 (JP) .................. 2015-198041

(51) Int. Cl.
*H01M 4/36* (2006.01)
*H01M 4/38* (2006.01)
*H01M 4/48* (2010.01)
*H01M 10/0525* (2010.01)
*H01M 10/0568* (2010.01)
(Continued)

(52) U.S. Cl.
CPC ....... *H01M 10/0525* (2013.01); *H01M 4/131* (2013.01); *H01M 4/134* (2013.01);
(Continued)

(58) Field of Classification Search
CPC ...... H01M 4/364; H01M 4/386; H01M 4/388; H01M 4/483; H01M 10/0525;
(Continued)

(56) References Cited

U.S. PATENT DOCUMENTS

2015/0037667 A1 2/2015 Suguro et al.
2015/0125740 A1* 5/2015 Kawasaki ............ H01M 4/364
429/163

FOREIGN PATENT DOCUMENTS

EP 2 533 343 A1 12/2012
JP 2005-011696 * 1/2005
(Continued)

OTHER PUBLICATIONS

English translation of JP Publication 2005-011696, Jan. 2005.*
(Continued)

*Primary Examiner* — Brittany L Raymond
(74) *Attorney, Agent, or Firm* — Cheng Law Group, PLLC (57) ABSTRACT

A lithium ion secondary battery 10 includes at least one cell obtained by laminating a positive electrode 1, an electrolyte layer 2, and a negative electrode 3 in this order. The electrolyte layer 2 contains a fluoride. The negative electrode 3 has a negative electrode active material layer containing a silicon compound. At least one of the negative electrodes 3 has a mass ratio of fluorine/silicon (F/Si ratio) of 1.0 or less on a surface of the negative electrode active material layer.

3 Claims, 4 Drawing Sheets (51) Int. Cl.
*H01M 10/0585* (2010.01)
*H01M 10/0567* (2010.01)
*H01M 4/134* (2010.01)
*H01M 4/131* (2010.01)
*H01M 10/056* (2010.01)
*H01M 4/02* (2006.01)

(52) U.S. Cl.
CPC ........... *H01M 4/364* (2013.01); *H01M 4/386* (2013.01); *H01M 4/388* (2013.01); *H01M 4/483* (2013.01); *H01M 10/056* (2013.01); *H01M 10/0567* (2013.01); *H01M 10/0568* (2013.01); *H01M 10/0585* (2013.01); *H01M 2004/027* (2013.01); *H01M 2300/0025* (2013.01); *H01M 2300/0034* (2013.01)

(58) Field of Classification Search
CPC ......... H01M 10/0568; H01M 10/0585; H01M 2004/027; H01M 2300/0025
See application file for complete search history.

(56) References Cited

FOREIGN PATENT DOCUMENTS

| | | |
|---|---|---|
| JP | 2005-11696 A | 1/2005 |
| JP | 2009-188141 A | 8/2009 |
| JP | 2014-139914 A | 7/2014 |
| JP | 2015-88450 A | 5/2015 |
| WO | WO-2013/115041 A1 | 8/2013 |

OTHER PUBLICATIONS

International Search Report for the Application No. PCT/JP2016/079618 dated Jan. 10, 2017.

Supplementary European Search Report for the Application No. EP 16 853 622.5 dated May 31, 2019.

* cited by examiner

LITHIUM ION SECONDARY BATTERY

TECHNICAL FIELD

The present invention relates to a lithium ion secondary battery. The present application claims priority based on Japanese Patent Application No. 2015-198041 filed on Oct. 5, 2015 in Japan, the contents of which are incorporated here by reference.

BACKGROUND ART

Generally, a lithium ion secondary battery includes a positive electrode, a negative electrode, and an electrolyte. As each of the positive electrode and the negative electrode, an electrode having an electrode active material layer is used. The electrode active material layer is usually formed by applying a composition containing an electrode active material, a conductive auxiliary agent, and a binder onto a current collector. In the lithium ion secondary battery, the electrode active material is an important factor involved in battery capacity, and graphite, silicon, or silicon oxide is used as a negative electrode active material, for example.

These negative electrode active materials have a function of occluding or releasing a lithium ion during charge and discharge, but have a problem that a lithium ion reacts irreversibly with the negative electrode active materials in initial charge, resulting in a decrease in battery capacity (discharge capacity). In order to avoid this problem, a treatment (pre-doping treatment) for doping a negative electrode active material layer constituting a negative electrode with a lithium ion in advance is performed before the initial charge. If the irreversible reaction is caused in advance by performing the pre-doping treatment, it is possible to suppress the irreversible reaction and generation of a by-product at the time of the initial charge thereafter.

The pre-doping treatment is performed by a method for bringing a lithium metal into contact with a negative electrode active material layer. In this case, it is known that an electrode interface film (SEI) is generated by decomposition of an electrolytic solution in addition to an irreversible active material such as lithium silicate ($Li_4SiO_4$) in the active material layer in direct contact with the lithium metal. The SEI functions as a lithium conductor capable of smoothly exchanging a lithium ion if the amount of the SEI is appropriate. However, in a case where the SEI is excessively generated, the SEI becomes a resistance and adversely affects battery characteristics. Patent Document 1 discloses a method for preventing generation of excessive SEI by rapid doping with a lithium ion by causing a negative electrode to face a Li source with a resistor interposed therebetween.

CITATION LIST

Patent Literature

[Patent Document 1]
Japanese Unexamined Patent Application, First Publication No. 2009-188141

SUMMARY OF INVENTION

Technical Problem

An object of the present invention is to provide a lithium ion secondary battery including a good SEI and having excellent charge and discharge characteristics.

Solution to Problem

The present inventors have found that a capacity retention ratio (cycle characteristics) of a lithium ion secondary battery is improved by an F/Si ratio of 1.0 or less in a negative electrode constituting the lithium ion secondary battery, and have completed the present invention. That is, the present invention is as follows.

[1] A lithium ion secondary battery including at least one cell obtained by laminating a positive electrode, an electrolyte layer, and a negative electrode in this order, in which the electrolyte layer contains a fluoride, the negative electrode has a negative electrode active material layer containing a silicon compound, and at least one of the negative electrodes has a mass ratio of fluorine/silicon (F/Si ratio) of 1.0 or less on a surface of the negative electrode active material layer.

[2] The lithium ion secondary battery according to [1], including a plurality of the cells, in which a value obtained by dividing a maximum value by a minimum value among F/Si ratios of the negative electrodes included in each of the cells is 1.0 to 3.0.

[3] The lithium ion secondary battery according to [1] or [2], in which two or more of the cells are laminated.

[4] The lithium ion secondary battery according to any one of [1] to [3], in which the negative electrode active material layer is pre-doped with lithium before initial charge.

Advantageous Effects of Invention

The present invention can provide a lithium ion secondary battery including a good SEI and having excellent charge and discharge characteristics.

DESCRIPTION OF EMBODIMENTS

A lithium ion secondary battery according to the present invention includes one or more positive electrodes, one or more electrolyte layers each containing a fluoride, and one or more negative electrodes each having a negative electrode active material layer containing a silicon compound. The lithium ion secondary battery includes a cell obtained by laminating a positive electrode, an electrolyte layer, and a negative electrode in this order. The lithium ion secondary battery includes at least one negative electrode having a mass ratio of fluorine/silicon (F/Si ratio) of 1.0 or less on a surface of the negative electrode active material layer.

<Lithium Ion Secondary Battery 10>

Figure 1:
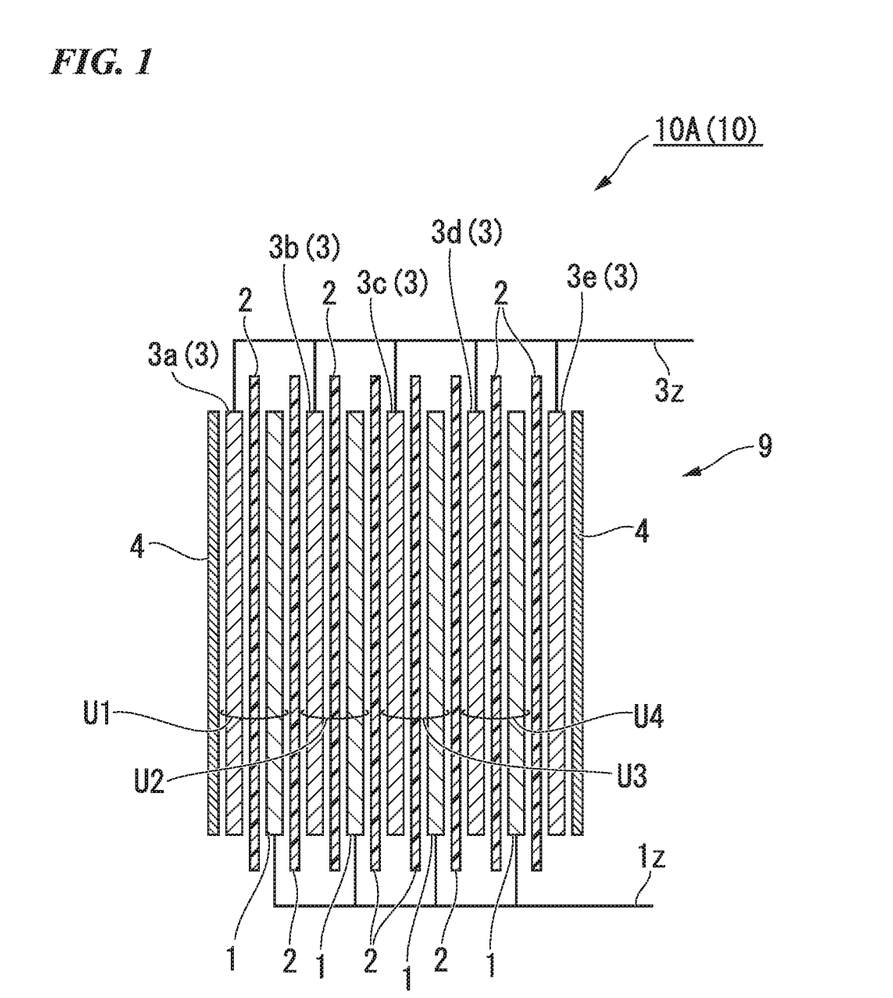
FIG. 1 is a schematic cross-sectional view showing a state where a lithium metal foil 4 is disposed in an electrode laminate 9 of a lithium ion secondary battery 10A according to the present invention.

FIG. 1 shows a lithium ion secondary battery 10A (10) according to a first embodiment of the present invention. The lithium ion secondary battery 10A includes a plurality of positive electrodes 1, a plurality of separators 2 each forming an electrolyte layer containing a fluoride, and a plurality of negative electrodes 3 each having a negative electrode active material layer containing a silicon compound.

FIG. 1 shows a cross section of an electrode laminate 9 including a plurality of cells each obtained by sequentially laminating the negative electrode 3, the separator 2, and the positive electrode 1 having a rectangular shape in plan view as an example of an electrode laminate. The electrode laminate 9 includes four cells each obtained by sequentially laminating the negative electrode 3/the separator 2/the positive electrode 1, that is, a first cell U1 to a fourth cell U4. The separator 2 is disposed between the cells laminated in the electrode laminate 9. In addition, a negative electrode 3e(3) is further laminated on an outer side of the fourth cell U4 via the separator 2.

Each positive electrode 1 has a configuration in which a (punched) aluminum foil having many through holes is present as a positive electrode current collector and positive electrode active material layers each formed of a positive electrode material are formed on both sides of the positive electrode current collector. The thickness of each positive electrode active material layer is preferably, for example, 5 µm to 80 µm.

Each separator 2 forms an electrolyte layer in which a porous resin sheet is impregnated with an electrolyte solution containing a fluoride. The thickness of the separator 2 is preferably, for example, 5 µm to 30 µm.

Each negative electrode 3 has a configuration in which a copper foil having many through holes is present as a negative electrode current collector and negative electrode active material layers each formed of a negative electrode material containing a silicon compound are formed on both sides of the negative electrode current collector. The thickness of each negative electrode active material layer is preferably, for example, 5 µm to 50 µm.

The lithium metal foil 4 is disposed so as to be in contact with a negative electrode 3a and the negative electrode 3e constituting outermost layers of the electrode laminate 9. The lithium metal foil 4 serves as a supply source of lithium in a pre-doping treatment. The thickness of each lithium metal foil 4 is preferably, for example, 10 µm to 500 µm.

A metal plate (metal foil) constituting each of the positive electrode current collector and the negative electrode current collector has many through holes. By the through holes formed in the current collector of each of the positive electrode 1 and the negative electrode 3, lithium can easily diffuse and transfer between the electrodes in a state where the positive electrode 1 and the negative electrode 3 are laminated. As a result, a lithium doping treatment is performed uniformly for each electrode, charge transfer resistance during use of a battery is reduced, and a battery capacity retention ratio is improved.

Each positive electrode 1 includes lead-out wires, and the lead-out wires are connected to each other and bundled to form a lead tab 1z.

Each negative electrode 3 includes lead-out wires, and the lead-out wires are connected to each other and bundled to form a lead tab 3z.

The electrode laminate 9 is housed in an exterior body made of an aluminum laminate (not shown) together with an electrolytic solution. The lead tab 1z and the lead tab 3z are extended to an outside of the exterior body, and the exterior body is sealed so as to prevent leakage of the electrolytic solution housed therein.

When a lithium doping treatment or initial charge is performed in the presence of an electrolytic solution containing a fluoride, a solid electrolyte interphase (SEI) containing lithium fluoride (LiF) is formed on a surface of a negative electrode active material constituting a negative electrode active material layer containing a silicon compound. In general, this SEI prevents a solvent molecule solvated by a lithium ion from entering a negative electrode when charge and discharge are repeated at the time of use, suppresses destruction of a negative electrode structure, and contributes to improvement of cycle characteristics of a lithium ion secondary battery. However, as described above, when the SEI is excessively generated, the SEI becomes a resistance and adversely affects battery characteristics.

The mass ratio of fluorine/silicon (F/Si ratio) is 1.0 or less on a surface of a negative electrode active material layer constituting at least one negative electrode 3 among the plurality of negative electrodes 3 included in the lithium ion secondary battery 10A of the present embodiment. Here, the F/Si ratio is a value measured by a usual method using SEM-EDX.

In measurement with SEM-EDX, an excessive electrolyte adhering to a surface of a negative electrode active material layer is washed out in advance using a poor solvent for the SEI. By measuring the surface of the negative electrode active material layer with SEM-EDX, a ratio between the mass of fluorine in the SEI and the mass of silicon in the negative electrode active material just under the SEI (F/Si ratio) is obtained.

For example, by using an apparatus having an energy dispersive X-ray analyzer EMAX mounted on a scanning electron microscope (S-4800 manufactured by Hitachi High-Technologies Corporation) and setting an accelerating voltage to 6 kV and a measurement area to a 20 µm square, element analysis, quantitative analysis, or the like is performed to obtain an F/Si ratio.

The electrode laminate 9 of the lithium ion secondary battery 10A includes the first negative electrode 3a to the fifth negative electrode 3e.

The F/Si ratio of each of the first negative electrode 3a, the second negative electrode 3b, the third negative electrode 3c, the fourth negative electrode 3d, and the fifth negative electrode 3e is a value obtained by averaging F/Si ratios of negative electrode active material layers formed on both sides of a punched copper foil as a negative electrode current collector, obtained by measurement with SEM-EDX (adding the F/Si ratios and dividing the sum by 2).

In a case where a negative electrode has a negative electrode active material layer formed only on one side of a punched copper foil as a negative electrode current collector, the F/Si ratio of the negative electrode is an F/Si ratio obtained by measuring the negative electrode active material layer on the one side with SEM-EDX.

The F/Si ratio of the negative electrode active material layer is an arithmetic average of F/Si ratio values measured with SEM-EDX for any 10 points of each negative electrode active material layer.

The capacity retention ratio (cycle characteristics) of the lithium ion secondary battery 10A is improved by an F/Si ratio of 1.0 or less in at least one of the negative electrodes 3 among the plurality of negative electrodes 3a to 3e included in the lithium ion secondary battery 10A. Although details of this mechanism are unknown, it is presumed that one reason is that excessive generation of SEI including LiF and the like is suppressed.

A lower limit value of the F/Si ratio may be 0. However, fluorine is often inevitably taken into a surface of a negative electrode active material layer by formation of SEI, and therefore, for example, 0.1 or more may be a practical lower limit value. Here, in a case where the F/Si ratio is 0, F in the numerator is 0.

As a method for reducing the F/Si ratio to 1.0 or less, for example, a method for relatively slowly advancing lithium doping during manufacturing a negative electrode is preferable. Specific examples thereof include a method for disposing a spacer between a lithium supply source and a negative electrode active material at the time of lithium doping, and a method for performing lithium doping at a low temperature.

Among the plurality of negative electrodes 3 included in the lithium ion secondary battery 10A, a ratio of the number of negative electrodes having an F/Si ratio of 1.0 or less is preferably 20 to 100%, more preferably 40 to 100%, still more preferably 60 to 100%, and most preferably 80% to 100%. As the number of negative electrodes having an F/Si ratio of 1.0 or less is larger, a capacity retention ratio of the lithium ion secondary battery 10A tends to be further improved.

In a case where the F/Si ratios of the first negative electrode 3a to the fifth negative electrode 3e are different from one another, a ratio between a maximum value and a minimum value (ratio of maximum/minimum) among the F/Si ratios of the negative electrodes 3 is preferably 1.0 to 3.0, more preferably 1.0 to 2.0, and still more preferably 1.0 to 1.5.

Within the above range, variation in the F/Si ratio among the negative electrodes is small, and charge and discharge characteristics such as the capacity retention ratio of the lithium ion secondary battery 10A are further improved. Although details of this mechanism are unknown, it is presumed that one reason is that variation in an electrode reaction in each negative electrode is suppressed.

The electrode laminate 9 of the lithium ion secondary battery 10A described above includes five negative electrodes 3. However, the lamination number of the negative electrodes 3 is not particularly limited, and for example, a configuration in which 1 to 20 negative electrodes 3 are laminated may be used. Outermost layers at both ends of the electrode laminate 9 of the lithium ion secondary battery 10A are the negative electrode 3a and the negative electrode 3e. However, the outermost layer is not limited to the negative electrode 3, but may be the positive electrode 1.

FIG. 1 shows a state where the lithium metal foil 4 is disposed outside the negative electrode 3a and the negative electrode 3e of the electrode laminate 9. However, by a lithium doping treatment during manufacturing a battery, a part or the whole of the lithium metal foil 4 may be dissolved.

<Method for Manufacturing Lithium Ion Secondary Battery>

Hereinafter, an exemplary example of a method for manufacturing the lithium ion secondary battery 10A will be described.

As a method for manufacturing the lithium ion secondary battery 10A, for example, first, the electrode laminate 9 obtained by laminating the negative electrode 3, the separator 2, and the positive electrode 1 is formed by a known method, and a battery is assembled while the lithium metal foil 4 is in contact with or close to the electrode laminate 9. Subsequently, a negative electrode active material layer constituting the negative electrode 3 is doped with a lithium ion while the electrode laminate 9 and the lithium metal foil 4 are impregnated with an electrolytic solution containing a fluoride.

Examples of a method for manufacturing the negative electrode 3 include a method for applying a negative electrode material containing a silicon compound onto a first surface of a punched plate-shaped negative electrode current collector to form a negative electrode active material layer, and if necessary, forming a negative electrode active material layer also on a second surface. Similarly, examples of a method for manufacturing the positive electrode 1 include a method for applying a positive electrode material onto a first surface and/or a second surface of a punched plate-shaped positive electrode current collector to form a positive electrode active material layer. The electrode laminate 9 shown in FIG. 1 is obtained by laminating the positive electrode 1 and the negative electrode 3 with the separator 2 interposed therebetween. At this time, when a negative electrode active material layer is disposed on a plate surface facing an outside of a negative electrode current collecting plate constituting an outermost layer of the electrode laminate 9, an electrode hardly bends, and an active material hardly peels off.

In FIG. 1, when the electrode laminate 9 is viewed in a laminating direction, the lithium metal foil 4 as a lithium supplier is disposed at a position in contact with or closely separated from a surface facing an outside of each of the negative electrode 3a and the negative electrode 3e constituting outermost layers.

In a case where an outermost negative electrode in the electrode laminate 9 is doped with excessive lithium, the lithium doping amount of a negative electrode active material layer on an inner side of each of the negative electrode 3a and the negative electrode 3e and the lithium doping amount of a negative electrode active material layer of each of the other negative electrodes 3b to 3d are relatively reduced. If the lithium doping amounts in the negative electrode active material layers of the negative electrodes 3 are nonuniform, the capacity retention ratio during use of a battery may decrease.

Figure 2:
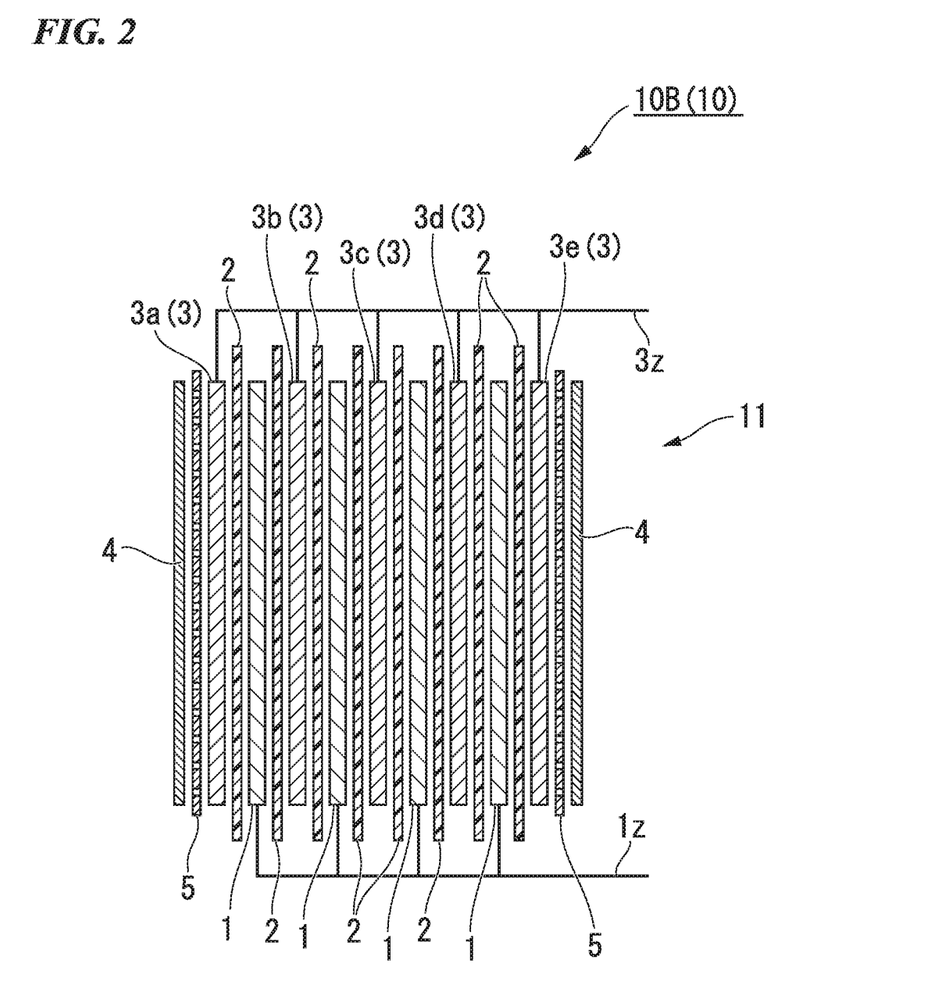
FIG. 2 is a schematic cross-sectional view showing a state where a lithium metal foil 4 is disposed in an electrode laminate 11 of a lithium ion secondary battery 10B according to the present invention.

As another embodiment in which the lithium metal foil 4 is disposed in the electrode laminate 9, as in a lithium ion secondary battery 10B (10) shown in FIG. 2, a method for laminating the lithium metal foil 4 with respect to the outermost negative electrodes 3a and 3e in the electrode laminate 9 via a spacer 5 is also an exemplary example. By physically separating the lithium metal foil 4 from the negative electrode 3a and the negative electrode 3e at both ends of the electrode laminate 9 in this manner, the lithium doping amounts for the negative electrodes 3a to 3e can be more uniform.

Examples of the spacer 5 include a (punched) metal plate having a through hole and a porous resin sheet. The spacer 5 preferably has many through holes for diffusion and transfer of lithium. The lithium metal foil 4 is preferably electrically connected to the negative electrode 3 from a viewpoint of increasing a doping rate of lithium. Therefore, in a case where the spacer 5 is an insulator, it is preferable to provide wiring between the lithium metal foil 4 and the lead tab 3z of the negative electrode 3 to be electrically connected. The thickness of the spacer 5 is not particularly limited, and only needs to be appropriately set, for example, between 10 µm and 1000 µm.

In the lithium doping treatment, the entire electrode laminate 9 and the entire lithium metal foil 4 are preferably impregnated with an electrolytic solution. A lithium ion eluted from the lithium metal foil 4 diffuses and transfers to each negative electrode 3, and the negative electrode active material layer is doped with the lithium ion. The kind of the electrolytic solution only needs to be a solution containing a solvent to which a lithium ion can be eluted. Preferable examples thereof include an electrolytic solution containing a known electrolyte such as a fluoride.

The lithium doping treatment is completed when a lithium ion eluted from the lithium metal foil 4 fills an irreversible capacity of a negative electrode active material. An indication of the completion of the doping treatment is empirically set. That is, by appropriately changing the time and temperature of the doping treatment and measuring a capacity retention ratio of a battery manufactured experimentally, conditions for obtaining the best capacity retention ratio are set. Usually, when the lithium doping treatment is completed, a part or the whole of the lithium metal foil 4 is dissolved and disappears.

The temperature of the lithium doping treatment is preferably 20° C. or lower, more preferably 15° C. or lower, and still more preferably 10° C. or lower. A lower limit value is a temperature at which an electrolytic solution does not freeze, and is usually preferably 0° C. or higher. By performing the lithium doping treatment in the above temperature range, a doping rate can be moderated, and therefore the plurality of negative electrodes 3a to 3e included in the electrode laminate 9 is uniformly doped with lithium. Whether the electrodes are uniformly doped can be confirmed by a fact that the F/Si ratio of each negative electrode is 1.0 or less, preferably uniform.

Examples of a lithium ion secondary battery which can be manufactured by the manufacturing method described above include a battery including a negative electrode having a negative electrode active material layer formed using a negative electrode material obtained by blending silicon oxide, a conductive auxiliary agent, and a binder, and pre-doped with lithium.

The lithium ion secondary battery has a high capacity development ratio and excellent charge and discharge characteristics due to use of the negative electrode pre-doped with lithium so as to have a predetermined F/Si ratio. In addition, in the lithium ion secondary battery manufactured by the above manufacturing method, a plurality of through holes is formed in each of a negative electrode current collector and a positive electrode current collector, and therefore an electrolyte (electrolytic solution) efficiently diffuses not only during manufacturing the lithium ion secondary battery but also during use thereof. As a result, battery performance of the lithium ion secondary battery can be improved.

Hereinafter, exemplary examples of a material which can be used in the lithium ion secondary battery according to the present invention and a method for manufacturing the lithium ion secondary battery will be described, but the present invention is not limited thereto.

[Negative Electrode Material]

Examples of the negative electrode material include a material obtained by blending a silicon compound as the negative electrode active material, a particulate conductive auxiliary agent, a fibrous conductive auxiliary agent, and a binder.

The silicon compound as the negative electrode active material is preferably silicon oxide.

(Silicon Oxide)

Examples of the silicon oxide include a compound represented by a general formula "$SiO_z$ (in the formula, z represents any number of 0.5 to 1.5)". Here, in a case where silicon oxide is viewed in a "SiO" unit, this SiO is amorphous SiO or a composite of Si and $SiO_2$ in which $SiO_2$ is present around nanocluster Si such that a molar ratio of Si:$SiO_2$ is about 1:1. $SiO_2$ is estimated to have a buffering effect on expansion and contraction of Si during charge and discharge.

The shape of the silicon oxide is not particularly limited, and for example, powdery or particulate silicon oxide can be used.

In the negative electrode material, a ratio of the blending amount of silicon oxide with respect to the total blending amount of silicon oxide, the particulate conductive auxiliary agent, the fibrous conductive auxiliary agent, and the binder can be, for example, 40 to 85% by mass. By the ratio of the blending amount of silicon oxide equal to or more than the lower limit value, a discharge capacity of the lithium ion secondary battery is further improved. By the ratio of the blending amount of silicon oxide equal to or less than the upper limit value, a negative electrode structure is easily maintained stably.

(Particulate Conductive Auxiliary Agent)

The particulate conductive auxiliary agent functions as a conductive auxiliary agent, has a particulate shape, and can contribute to improvement of conductivity of a negative electrode material by widening a contact area between conductive materials in the negative electrode material. Preferable examples of the particulate conductive auxiliary agent include: carbon black such as acetylene black or Ketjen black, graphite, and fullerene.

One particulate conductive auxiliary agent or a combination of two or more kinds thereof may be used.

In the negative electrode material, a ratio of the blending amount of the particulate conductive auxiliary agent with respect to the total blending amount of silicon oxide, the particulate conductive auxiliary agent, the fibrous conductive auxiliary agent, and the binder can be, for example, 3 to 30% by mass. By the ratio of the blending amount of the particulate conductive auxiliary agent equal to or more than the lower limit value, an effect obtained by use of the particulate conductive auxiliary agent is more remarkably obtained. By the ratio of the blending amount of the particulate conductive auxiliary agent equal to or less than the upper limit value, an effect obtained by combined use with the fibrous conductive auxiliary agent is more remarkably obtained.

(Fibrous Conductive Auxiliary Agent)

The fibrous conductive auxiliary agent is a fibrous material functioning as a conductive auxiliary agent, and preferable examples thereof include a carbon nanotube and a carbon nanohorn.

It is presumed that the fibrous conductive auxiliary agent contributes to stabilization of the structure of the negative electrode active material layer by forming a network structure in a negative electrode active material layer described later, preferably in the entire negative electrode active material layer, and contributes to improvement of conductivity by forming a conductive network in the negative electrode active material layer.

One fibrous conductive auxiliary agent or a combination of two or more kinds thereof may be used.

In the negative electrode material, a ratio of the blending amount of the fibrous conductive auxiliary agent with respect to the total blending amount of silicon oxide, the particulate conductive auxiliary agent, the fibrous conductive auxiliary agent, and the binder can be, for example, 1 to 25% by mass. By the ratio of the blending amount of the fibrous conductive auxiliary agent equal to or more than the lower limit value, an effect obtained by use of the fibrous conductive auxiliary agent is more remarkably obtained. By the ratio of the blending amount of the fibrous conductive auxiliary agent equal to or less than the upper limit value, an effect obtained by combined use with the particulate conductive auxiliary agent, that is, both effects are more remarkably obtained.

In the negative electrode material, a mass ratio of the blending amount (blending mass ratio) of "particulate conductive auxiliary agent:fibrous conductive auxiliary agent" can be, for example, 90:10 to 30:70. By the blending mass ratio between the particulate conductive auxiliary agent and the fibrous conductive auxiliary agent within such a range, an effect obtained by use of the particulate conductive auxiliary agent and the fibrous conductive auxiliary agent is more remarkably obtained.

(Binder)

The binder may be a known binder, and preferable examples thereof include polyacrylic acid (PAA), lithium polyacrylate (PAALi), polyvinylidene fluoride (PVDF), polyvinylidene fluoride-hexafluoropropylene copolymer (PVDF-HFP), styrene butadiene rubber (SBR), polyvinyl alcohol (PVA), polyethylene oxide (PEO), polyethylene glycol (PEG), carboxymethyl cellulose (CMC), polyacrylonitrile (PAN), and polyimide (PI).

One binder or a combination of two or more kinds thereof may be used. In a case where two or more binders are used in combination, the combination thereof and the ratio thereof only need to be appropriately selected according to a purpose.

In the negative electrode material, a ratio of the blending amount of the binder with respect to the total blending amount of silicon oxide, the particulate conductive auxiliary agent, the fibrous conductive auxiliary agent, and the binder can be, for example, 3 to 30% by mass. By the ratio of the blending amount of the binder equal to or more than the lower limit value, a negative electrode structure is maintained more stably. By the ratio of the blending amount of the binder equal to or less than the upper limit value, a discharge capacity is further improved.

(Other Components)

The negative electrode material may further include another component not corresponding to silicon oxide, the particulate conductive auxiliary agent, the fibrous conductive auxiliary agent, or the binder in addition to these materials.

The other component can be arbitrarily selected according to a purpose, and preferable examples thereof include a solvent for dissolving or dispersing the above blending components (silicon oxide, particulate conductive auxiliary agent, fibrous conductive auxiliary agent, and binder).

Such a negative electrode material further including a solvent is preferably a liquid composition having fluidity at the time of use.

The solvent can be arbitrarily selected according to the kind of the blending component, and preferable examples thereof include water and an organic solvent.

Preferable examples of the organic solvent include: an alcohol such as methanol, ethanol, 1-propanol, or 2-propanol; a chain or cyclic amide such as N-methylpyrrolidone (NMP) or N,N-dimethylformamide (DMF); and a ketone such as acetone.

One solvent or a combination of two or more kinds thereof may be used. In a case where two or more solvents are used in combination, the combination thereof and the ratio thereof only need to be appropriately selected according to a purpose.

The blending amount of the solvent in the negative electrode material is not particularly limited, and only needs to be adjusted appropriately according to a purpose. For example, in a case where a negative electrode active material layer is formed by applying and drying a negative electrode material as a liquid composition including a solvent, it is only required to adjust the blending amount of the solvent such that the liquid composition has a viscosity suitable for application. Specifically, it is good to adjust the blending amount of the solvent such that, in the negative electrode material, a ratio of the total amount of the blending components other than the solvent with respect to the total amount of the blending components is preferably 5 to 60% by mass, and more preferably 10 to 35% by mass.

In a case where a component other than the solvent (another solid component) is blended as the other component, in the negative electrode material, a ratio of the blending amount of the other solid component with respect to the total amount of the blending components other than the solvent is preferably 10% by mass or less, and more preferably 5% by mass or less.

The negative electrode material can be manufactured by blending the silicon oxide, the particulate conductive auxiliary agent, the fibrous conductive auxiliary agent, and the binder, and if necessary, other components.

Examples of a material of the negative electrode current collector on which the negative electrode active material layer is formed include copper (Cu), aluminum (Al), titanium (Ti), nickel (Ni), and stainless steel.

The negative electrode current collector preferably has a sheet shape (plate shape), and preferably has a thickness of 5 μm to 20 μm.

[Positive Electrode Material]

Examples of the positive electrode material include a positive electrode material obtained by blending a positive electrode active material, a binder, and a solvent, and if necessary, a conductive auxiliary agent or the like.

Examples of the positive electrode material include a lithium metallate compound represented by a general formula "$LiM_xO_y$ (in the formula, M represents a metal, and x and y represent a composition ratio between metal M and oxygen O").

Examples of such a lithium metallate compound include lithium cobaltate ($LiCoO_2$), lithium nickelate ($LiNiO_2$), and lithium manganate ($LiMn_2O_4$). An olivine type lithium iron phosphate ($LiFePO_4$) having a similar composition can also be used.

The lithium metallate compound may have a plurality of kinds of Ms in the above general formula. Examples of such a lithium metallate compound include a compound represented by a general formula "$LiM^1_pM^2_qM^3_rO_y$ (in the formula, $M^1$, $M^2$, and $M^3$ represent metals different from one another, and p, q, r, and y represent a composition ratio among metals $M^1$, $M^2$, and $M^3$, and oxygen O)." Here, $p+q+r=x$ is satisfied. Examples of such a lithium metallate compound include $LiNi_{0.33}Mn_{0.33}Co_{0.33}O_2$.

One positive electrode material or a combination of two or more kinds thereof may be used.

Examples of the conductive auxiliary agent in the positive electrode include graphite, carbon black such as Ketjen black or acetylene black, carbon nanotubes, carbon nanohorns, graphene, and fullerene.

One conductive auxiliary agent or a combination of two or more kinds thereof may be used in the positive electrode.

The binder, the solvent, and the current collector in the positive electrode may be similar to the binder, the solvent, and the current collector in the negative electrode.

Ratios of the blending amounts of the positive electrode active material, the binder, the solvent, and the conductive auxiliary agent with respect to the total amount of the blending components in the positive electrode material can be similar to the ratios of the blending amounts of the negative electrode active material, the binder, the solvent, and the conductive auxiliary agent with respect to the total amount of the blending components in the negative electrode material, respectively.

[Electrolytic Solution]

Examples of the electrolytic solution include a solution obtained by blending a lithium carboxylate (A), boron trifluoride and/or boron trifluoride complex (B), and an organic solvent (C) (hereinafter, also abbreviated as a "first electrolytic solution").

The lithium carboxylate (A) may be a lithium salt of any one of an aliphatic carboxylic acid, an alicyclic carboxylic acid, and an aromatic carboxylic acid, and may be a lithium salt of either a monovalent carboxylic acid or a polyvalent carboxylic acid as long as the lithium carboxylate (A) is an electrolyte and has a carboxy group constituting the lithium salt (—C(=O)—OLi). In the lithium carboxylate (A), the number of carboxy groups constituting the lithium salt is not particularly limited. For example, in a case where the number of carboxy groups is 2 or more, all of the carboxy groups may constitute the lithium salt, or only some of the carboxy groups may constitute the lithium salt.

Preferable examples of the lithium carboxylate (A) include: a lithium salt of a monovalent carboxylic acid such as lithium formate (HCOOLi), lithium acetate ($CH_3COOLi$), lithium propionate ($CH_3CH_2COOLi$), lithium butyrate ($CH_3(CH_2)_2COOLi$), lithium isobutyrate (($CH_3)_2CHCOOLi$), lithium valerate ($CH_3(CH_2)_3COOLi$), lithium isovalerate (($CH_3)_2CHCH_2COOLi$), or lithium caproate ($CH_3(CH_2)_4COOLi$); a lithium salt of a divalent carboxylic acid such as lithium oxalate (($COOLi)_2$), lithium malonate ($LiOOCCH_2COOLi$), lithium succinate (($CH_2COOLi)_2$), lithium glutarate ($LiOOC(CH_2)_3COOLi$), or lithium adipate (($CH_2CH_2COOLi)_2$); a lithium salt of a monovalent carboxylic acid having a hydroxy group, such as lithium lactate ($CH_3CH(OH)COOLi$); a lithium salt of a divalent carboxylic acid having a hydroxy group, such as lithium tartarate (($CH(OH)COOLi)_2$) or lithium malate ($LiOOCCH_2CH(OH)COOLi$); a lithium salt of an unsaturated divalent carboxylic acid such as lithium maleate ($LiOOCCH=CHCOOLi$, cis form) or lithium fumarate ($LiOOCCH=CHCOOLi$, trans form); and a lithium salt of a trivalent carboxylic acid (lithium salt of a trivalent carboxylic acid having a hydroxy group) such as lithium citrate ($LiOOCCH_2C(COOLi)(OH)CH_2COOLi$). Among these compounds, lithium formate, lithium acetate, lithium oxalate, and lithium succinate are more preferable, and lithium oxalate is particularly preferable.

One lithium carboxylate (A) or a combination of two or more kinds thereof may be used. In a case where two or more lithium carboxylates (A) are used in combination, the combination thereof and the ratio thereof only need to be appropriately selected according to a purpose.

The boron trifluoride and boron trifluoride complex (B) is a compound to perform a complex forming reaction with the lithium carboxylate (A). The boron trifluoride complex is a compound in which boron trifluoride ($BF_3$) is coordinated to another component.

Preferable examples of the boron trifluoride complex include: a boron trifluoride alkyl ether complex such as a boron trifluoride dimethyl ether complex ($BF_3.O(CH_3)_2$), a boron trifluoride diethyl ether complex ($BF_3.O(C_2H_5)_2$), a boron trifluoride di-n-butyl ether complex ($BF_3.O(C_4H_9)_2$), a boron trifluoride di-tert-butyl ether complex ($BF_3.O((CH_3)_3C)_2$), a boron trifluoride tert-butylmethyl ether complex ($BF_3.O((CH_3)_3C)(CH_3)$), or a boron trifluoride tetrahydrofuran complex ($BF_3.OC_4H_8$); and a boron trifluoride alcohol complex such as a boron trifluoride methanol complex ($BF_3.HOCH_3$), a boron trifluoride propanol complex ($BF_3.HOC_3H_7$), or a boron trifluoride phenol complex ($BF_3.HOC_6H_5$).

As the boron trifluoride and/or boron trifluoride complex (B), the boron trifluoride complex is preferably used from a viewpoint that handling is easy and a complex forming reaction proceeds more smoothly.

One of boron trifluoride and boron trifluoride complex (B) or a combination of two or more kinds thereof may be used.

The blending amount of the boron trifluoride and/or boron trifluoride complex (B) is not particularly limited, and only needs to be appropriately adjusted according to the kind of the boron trifluoride and/or boron trifluoride complex (B) or the lithium carboxylate (A). Usually, a molar ratio of [blending amount (number of moles) of boron trifluoride and/or boron trifluoride complex (B)]/[number of moles of lithium atoms in blended lithium carboxylate (A)] is preferably 0.5 or more, and more preferably 0.7 or more. Within such a range, solubility of the lithium carboxylate (A) in the organic solvent (C) is further improved. An upper limit value of the molar ratio is not particularly limited, but is preferably 2.0, and is more preferably 1.5.

The organic solvent (C) is not particularly limited. However, specific preferable examples thereof include: a carbonate ester such as ethylene carbonate, propylene carbonate, butylene carbonate, dimethyl carbonate, ethyl methyl carbonate, diethyl carbonate, or vinylene carbonate; a lactone compound such as γ-butyrolactone; a carboxylate ester such as methyl formate, methyl acetate, or methyl propionate; an ether compound such as tetrahydrofuran or dimethoxyethane; a nitrile compound such as acetonitrile; and a sulfone compound such as sulfolane.

One organic solvent (C) or a combination of two or more kinds thereof may be used.

The organic solvent (C) is preferably at least one selected from the group consisting of ethylene carbonate, propylene carbonate, butylene carbonate, dimethyl carbonate, ethyl methyl carbonate, diethyl carbonate, vinylene carbonate, γ-butyrolactone, tetrahydrofuran, dimethoxyethane, methyl formate, methyl acetate, methyl propionate, acetonitrile, and sulfolane.

As the organic solvent (C) containing two or more kinds of solvents, a mixed solvent obtained by blending propylene carbonate and vinylene carbonate, a mixed solvent obtained by blending propylene carbonate and ethylene carbonate, a mixed solvent obtained by blending ethylene carbonate and dimethyl carbonate are preferable.

The blending amount of the organic solvent (C) in the electrolytic solution is not particularly limited, and only needs to be appropriately adjusted according to, for example, the kind of the electrolyte. Usually, the blending amount is preferably adjusted such that the concentration of lithium atoms (Li) is preferably 0.2 to 3.0 mol/kg, and more preferably 0.4 to 2.0 mol/kg.

Examples of the electrolytic solution include a solution obtained by dissolving a known lithium salt other than the lithium carboxylate (A), such as lithium hexafluorophosphate (LiPF$_6$), lithium tetrafluoroborate (LiBF$_4$), lithium bisfluorosulfonylimide (LiFSI), or lithium bis(trifluoromethanesulfonyl) imide (LiN(SO$_2$CF$_3$)$_2$, LiTFSI) as an electrolyte in an organic solvent (hereinafter, also abbreviated as a "second electrolytic solution").

One electrolyte or a combination of two or more kinds thereof may be used in the second electrolytic solution.

Examples of the organic solvent in the second electrolytic solution include the same solvents as examples of the organic solvent (C) in the first electrolytic solution. The concentration of the lithium atoms (Li) in the second electrolytic solution is also similar to the case of the first electrolytic solution.

Each of the first and second electrolytic solutions may contain an optional component used in an electrolytic solution of a known lithium ion secondary battery within a range not impairing an effect of the present invention.

[Separator]

Examples of a material of the separator include a porous resin film, a nonwoven fabric, and a glass fiber.

Furthermore, as the separator, a porous insulating layer formed on a surface of a positive electrode active material layer or a surface of a negative electrode active material layer, and capable of insulating a positive electrode and a negative electrode and holding and transmitting an electrolytic solution can also be applied. The porous insulating layer is formed, for example, by a known method for applying a composition containing insulating inorganic particles and a binder resin onto a surface of a negative electrode or a positive electrode and drying the composition. The thickness of the porous insulating layer is preferably, for example, about 0.5 μm to 50 μm.

EXAMPLES

Hereinafter, the present invention will be described in more detail with reference to Examples. However, the present invention is not limited to the following Examples at all.

Example 1

[Manufacture of Negative Electrode]

Silicon monoxide (SiO, average particle diameter 1.0 μm, 69 parts by mass), SBR (3 parts by mass), and polyacrylic acid (12 parts by mass) were put in a reagent bottle. Distilled water was further added thereto, and the concentration thereof was adjusted. Thereafter, the resulting mixture was mixed for two minutes at 2000 rpm using a rotating and revolving mixer. Acetylene black (10 parts by mass) was added to this mixture, and the resulting mixture was mixed for two minutes at 2000 rpm using a rotating and revolving mixer. This mixture was dispersed for 10 minutes with an ultrasonic homogenizer, and then again mixed for two minutes at 2000 rpm using a rotating and revolving mixer to obtain a slurry of a negative electrode material.

[Manufacture of Positive Electrode Material]

Lithium cobaltate (LiCo$_2$O) (93 parts by mass), polyvinylidene fluoride (PVDF) (4 parts by mass), and carbon black as a conductive auxiliary agent (3 parts by mass) were mixed to prepare a positive electrode composite material. The positive electrode composite material was dispersed in N-methylpyrrolidone (NMP) to obtain a slurry of a positive electrode material.

[Manufacture of Negative Electrode]

A punched copper foil having a size of length×width=40 mm×55 mm, a thickness of 10 μm, a hole diameter of 0.35 mm, and a porosity of 17.2%, manufactured by Fukuda Metal Foil & Powder Co., Ltd. was prepared.

A negative electrode material was applied onto both sides of the punched copper foil with an application thickness of 30 μm, dried, and then pressed to obtain a negative electrode in which a negative electrode active material layer having substantially the same area as the punched copper foil was formed.

[Manufacture of Positive Electrode]

A punched Al foil having a size of length×width=40 mm×55 mm, a thickness of 15 μm, a hole diameter of 0.35 mm, and a porosity of 17.2%, manufactured by Fukuda Metal Foil & Powder Co., Ltd. was prepared.

A positive electrode material was applied onto both sides of the punched Al foil with an application thickness of 42.5 μm, dried, and then pressed to obtain a positive electrode in which a positive electrode active material layer having substantially the same area as the punching copper Al was formed.

[Manufacture of Electrolytic Solution]

A lithium oxalate-boron trifluoride complex was added to a mixed solvent of EC and PC (EC:PC=30:70 (volume ratio)) so as to have a concentration of 1.0 mol/kg, and the resulting mixture was mixed at 23° C. to obtain an electrolytic solution.

[Manufacture of Electrode Laminate]

The lithium ion secondary battery 10A including the electrode laminate 9 shown in FIG. 1 was manufactured by the following method. The separator 2 having a thickness of 25 μm and a surface area of 42 cm×57 cm (manufactured by Sekisui Chemical Co., Ltd.) was disposed between the negative electrode 3 and the positive electrode 1 prepared above to obtain a laminated cell (negative electrode/separator/positive electrode). Four of the cells were prepared. The positive electrode 1 and the negative electrode 3 in adjacent units were caused to face each other. The separator 2 was disposed therebetween to laminate the first to fourth cells U1 to U4. Outermost layers of this laminate were the negative electrode 3a of the first unit U1 and the positive electrode 1 of the fourth unit U4. Another negative electrode 3e was disposed on an outer surface of the positive electrode 1 of the outermost fourth unit U4 via the separator 2 to obtain the electrode laminate 9.

The lithium metal foils 4 each having substantially the same area as the punched copper foil and having a thickness of 100 μm were placed on both sides of each of the outermost layers of the electrode laminate 9 to obtain the electrode laminate 9 having the lithium metal foils 4 disposed on the outermost layers (refer to FIG. 1).

[Assembly of Battery]

The electrode laminate 9 was housed in an exterior body (not shown) made of an aluminum laminate while the lead tab 3z for electrically connecting the negative electrodes 3 constituting the electrode laminate 9 to one another and the lead tab 1z for electrically connecting the positive electrodes 1 to one another were protruded to an outside, and the exterior body was temporarily sealed. An electrolytic solution was injected into the exterior body, and then the exterior body was fully sealed to obtain the intended lithium ion secondary battery 10A.

[Pre-Doping Step of Lithium]

The lithium ion secondary battery 10A manufactured above was fixed while being pressurized with a pressurizing jig, and was allowed to stand for 72 hours in a thermostatic chamber at 25° C. to perform a lithium pre-doping treatment.

Example 2

The lithium ion secondary battery 10B was manufactured in a similar manner to Example 1 except that, in the outermost layers of the electrode laminate 9 manufactured in Example 1, an electrode laminate 11 obtained by disposing a punched copper foil (length×width=40 mm×55 mm, thickness: 15 μm, hole diameter: 0.35 mm, porosity: 16.7%, manufactured by Fukuda Metal Foil & Powder Co., Ltd.) as a spacer 5 so as to be sandwiched between each of the negative electrodes 3a and 3e and the lithium metal foil 4 was used (refer to FIG. 2).

A lithium pre-doping treatment was performed at 25° C. in a similar manner to Example 1.

Example 3

The lithium ion secondary battery 10B was manufactured using the electrode laminate 11 manufactured in a similar manner to Example 2 (refer to FIG. 2).

A lithium pre-doping treatment was performed in a similar manner to Example 2 except that the temperature was changed to 10° C.

Comparative Example 1

Figure 3:
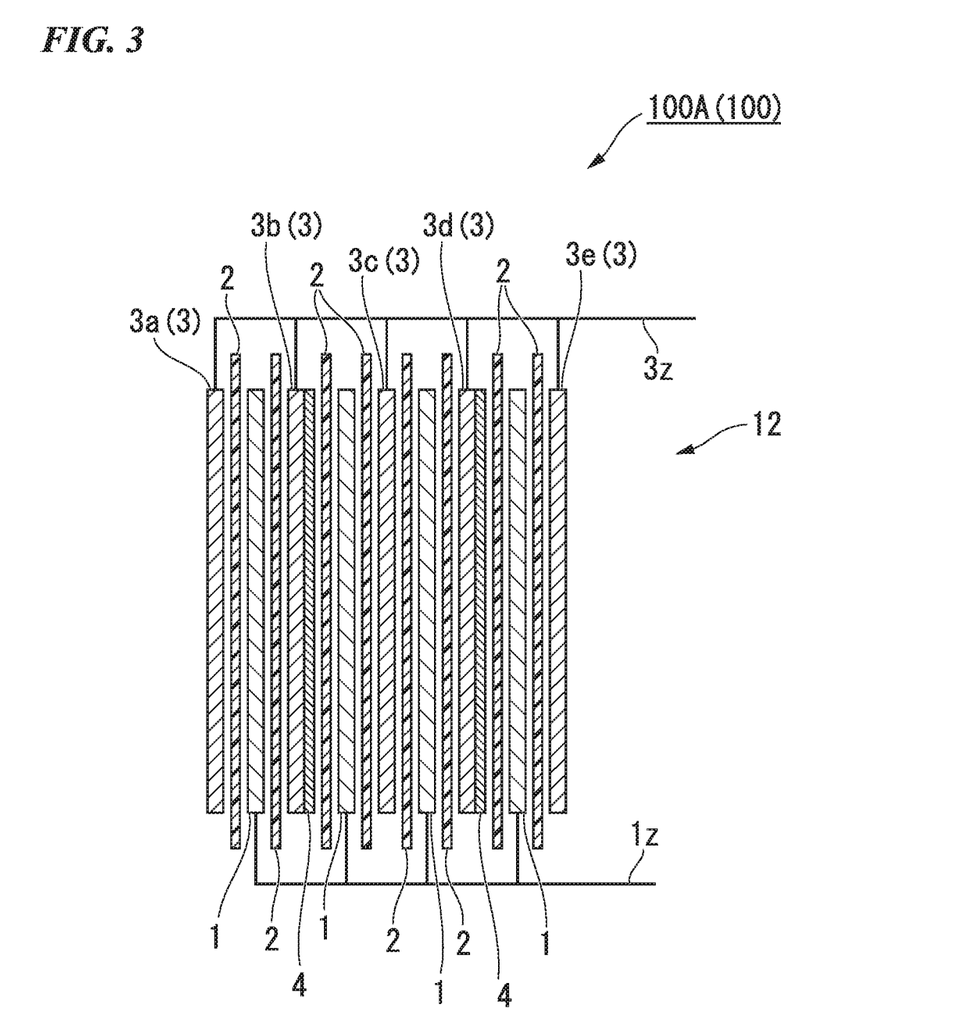
FIG. 3 is a schematic cross-sectional view showing a state where a lithium metal foil 4 is disposed in an electrode laminate 12 of a conventional lithium ion secondary battery 100A.

A lithium ion secondary battery 100A was manufactured in a similar manner to Example 1 except that, in the electrode laminate 9 manufactured in Example 1, an electrode laminate 12 obtained by disposing the lithium metal foil 4 having substantially the same area as the negative electrode 3b between the negative electrode 3b in the second unit U2 and the separator 2, and disposing the lithium metal foil 4 having substantially the same area as the negative electrode 3d between the negative electrode 3d in the fourth unit U4 and the separator 2 was used, and the lithium metal foil 4 was not disposed on an outermost layer of the electrode laminate 12 (refer to FIG. 3).

A lithium pre-doping treatment was performed at 25° C. in a similar manner to Example 1.

Comparative Example 2

Figure 4:
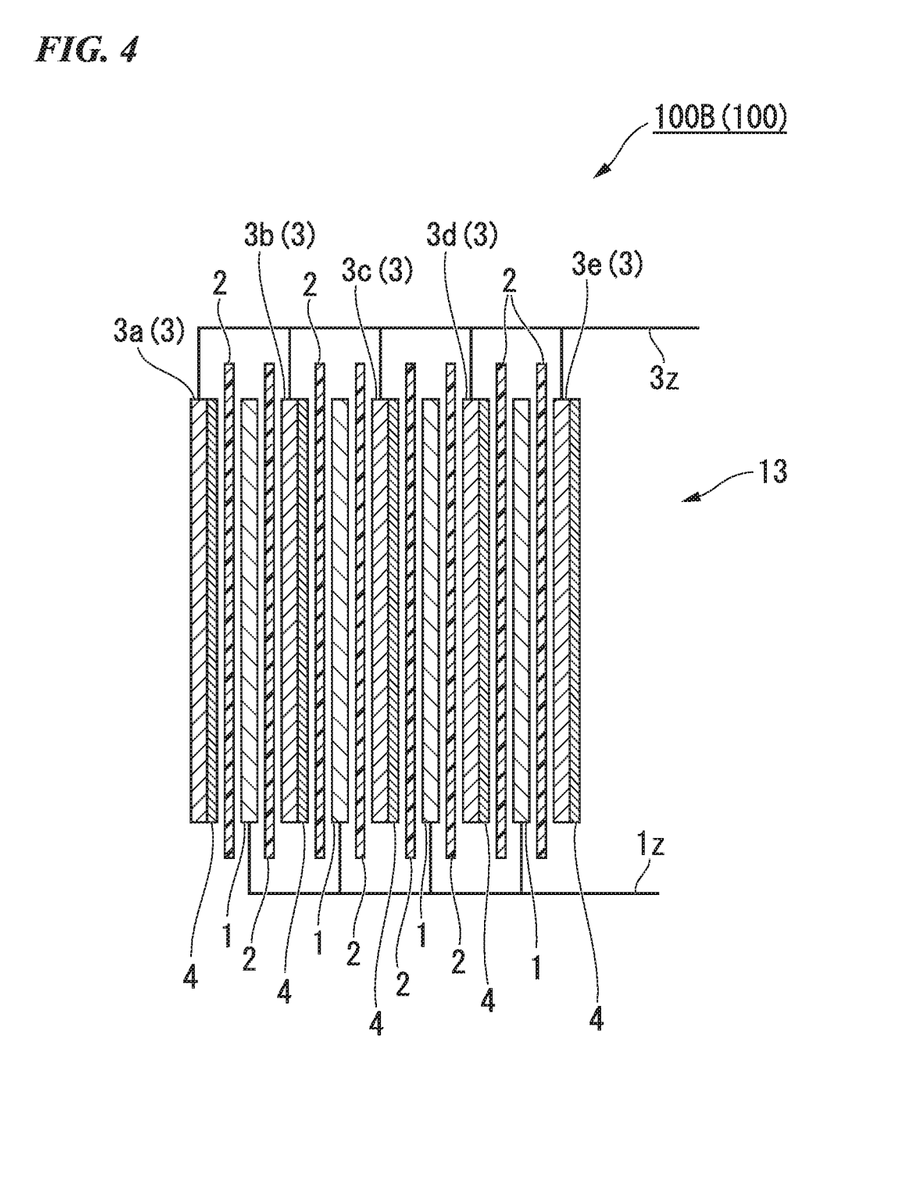
FIG. 4 is a schematic cross-sectional view showing a state where a lithium metal foil 4 is disposed in an electrode laminate 13 of a conventional lithium ion secondary battery 100B.

A lithium ion secondary battery 100B was manufactured in a similar manner to Example 1 except that, in the electrode laminate 9 manufactured in Example 1, an electrode laminate 13 obtained by disposing each of the lithium metal foils 4 between each of the negative electrodes 3 and each of the separators 2, that is, disposing five lithium metal foils 4 in total was used (refer to FIG. 4).

A lithium pre-doping treatment was performed at 25° C. in a similar manner to Example 1.

Comparative Example 3

A battery assembled in a similar manner to Example 2 was used (refer to FIG. 2).

A lithium pre-doping treatment was performed in a similar manner to Example 2 except that the temperature was changed to 45° C.

<Evaluation Method>
[Evaluation of Charge and Discharge Characteristics of Lithium Ion Secondary Battery]

With regard to the lithium ion secondary batteries obtained in the above Examples and Comparative Examples, constant current constant voltage charge of 0.1 C at 25° C. was performed until a current value converged to 0.05 C with an upper limit voltage of 4.35 V. Thereafter, constant current discharge of 0.1 C was performed up to 2.5 V. Subsequently, the charge and discharge cycle was repeated three times at a charge and discharge current of 0.5 C in a similar manner to stabilize a state of each of the lithium ion secondary batteries. Subsequently, charge and discharge were performed at a charge and discharge current of 0.2 C in a similar manner, and a capacity development ratio ({[discharge capacity at first cycle (mAh)]/[rated capacity (mAh)]}×100) (%) was calculated. A charge and discharge cycle was repeated at a charge and discharge current of 1 C in a similar manner, and a capacity retention ratio at 100th cycle ({[discharge capacity at 100th cycle (mAh)]/[discharge capacity at first cycle (mAh)]}×100) (%) was calculated. Table 1 indicates results of the obtained capacity retention ratios.

TABLE 1

| | Example 1 | Example 2 | Example 3 | Comparative Example 1 | Comparative Example 2 | Comparative Example 3 |
|---|---|---|---|---|---|---|
| Capacity retention ratio (%) | 80 | 85 | 90 | 75 | 68 | 73 |

[Evaluation of Lithium Pre-Doping on Negative Electrode]

Each of the lithium ion secondary batteries manufactured in the above Examples and Comparative Examples was subjected to a lithium pre-doping treatment and initial charge, and then the electrode laminate was taken out of the exterior body and disassembled. All the negative electrodes were taken out, an electrolyte attached to a surface of each negative electrode active material layer was washed with the mixed solvent.

Subsequently, the mass ratio between a fluorine atom and a silicon atom (F/Si ratio) on a surface of a negative electrode active material layer of each negative electrode was measured with SEM-EDX. The average value of the F/Si ratios of negative electrode active material layers formed on both sides of a punched copper foil constituting a negative electrode was taken as a value of the F/Si ratio of each negative electrode. Table 2 indicates the results thereof.

TABLE 2

| | (F/Si ratio) | | | | |
|---|---|---|---|---|---|
| | Negative electrode 3a | Negative electrode 3b | Negative electrode 3c | Negative electrode 3d | Negative electrode 3e |
| Example 1 | 2.23 | 1.48 | 0.96 | 1.48 | 2.23 |
| Example 2 | 1.01 | 0.88 | 0.80 | 0.96 | 1.02 |
| Example 3 | 0.98 | 0.96 | 0.95 | 0.96 | 0.99 |
| Comparative Example 1 | 1.50 | 2.15 | 1.48 | 2.23 | 1.37 |
| Comparative Example 2 | 2.20 | 2.11 | 2.23 | 2.23 | 2.23 |
| Comparative Example 3 | 2.01 | 1.31 | 1.15 | 1.28 | 1.98 |

Maximum value/minimum value of F/Si ratio in Example 1 was 2.32, maximum value/minimum value of F/Si ratio in Example 2 was 1.28, maximum value/minimum value of F/Si ratio in Example 3 was 1.04, maximum value/minimum value of F/Si ratio in Comparative Example 1 was 1.51, maximum value/minimum value of F/Si ratio in Comparative Example 2 was 1.05, and maximum value/minimum value of F/Si ratio in Comparative Example 3 was 1.75.

In the above results, the capacity retention ratios in Examples 1 to 3 were better than those in Comparative Examples 1 to 3.

It is considered that this is because it was possible to prevent excessive generation of SEI containing a fluorine compound such as LiF in a negative electrode range capable of functioning as an active material, therefore the range usable as the active material was hardly reduced (the degree of reduction was decreased), and cycle characteristics were improved.

Furthermore, in comparison among Examples 1 to 3, a ratio of the number of negative electrodes having an F/Si ratio of 1.0 or less was 1/5 (20%) in Example 1, 3/5 in Example 2 (60%), and 5/5 in Example 3 (100%). In this way, it was confirmed that as the ratio of the negative electrode having an F/Si ratio of 1.0 or less increased, the capacity retention ratio of the lithium ion secondary battery improved.

Furthermore, in comparison among Examples 1 to 3, it was confirmed that as the maximum value/minimum value of the F/Si ratio was smaller, the capacity retention ratio of a lithium ion secondary battery improved. A reason why the capacity retention ratio is improved in this way is considered to be that when a lithium doping state is uniform among the negative electrodes, SEI to be generated is also uniform among the negative electrodes, and a bias in an electrode reaction between the negative electrodes hardly occurs.

The configurations, combinations thereof, and the like in the embodiments described above are merely examples, and addition of a known configuration, omission, substitution, and another modification are possible within a range not departing from the gist of the present invention. Furthermore, the present invention is not limited by the embodiments.

REFERENCE SIGNS LIST 10, 10A, 10B, 100, 100A, 100B Lithium ion secondary battery
1 Positive electrode
1z Lead tab
2 Separator
3, 3a to 3e Negative electrode
3z Lead tab
4 Lithium metal foil
5 Spacer
U1 to U4 Cell
9, 11, 12, 13 Electrode laminate

What is claimed is:

1. A lithium ion secondary battery comprising an electrode laminate having a plurality of cells, each of which is independently a laminate of a positive electrode, a separator, and a negative electrode in this order, wherein
    the negative electrode in each laminate has a negative electrode active material layer containing a silicon compound,
    each of the negative electrodes has a mass ratio of fluorine/silicon (F/Si ratio) ranging from more than 0 to 1.0 on a surface of the negative electrode active material layer, and
    a value obtained by dividing a maximum value by a minimum value among F/Si ratios of the negative electrodes included in each of the cells is 1.04 to 2.32.

2. The lithium ion secondary battery according to claim 1, wherein the negative electrode active material layer is pre-doped with lithium before initial charge.

3. A method of manufacturing a lithium ion secondary battery comprising an electrode laminate having a plurality of cells, each of which is independently a laminate of a positive electrode, a separator, and a negative electrode which are laminated in this order, wherein
    the negative electrode in each laminate has a negative electrode active material layer containing a silicon compound,
    each of the negative electrodes has a mass ratio of fluorine/silicon (F/Si ratio) ranging from more than 0 to 1.0 on a surface of the negative electrode active material layer, and
    a value obtained by dividing a maximum value by a minimum value among F/Si ratios of the negative electrodes included in each of the cells is 1.04 to 2.32,
    the method comprising: a lithium doping treatment which is performed by immersing the electrode laminate and a lithium metal foil in an electrolytic solution containing a fluoride at a temperature in a range of 0-20° C.

* * * * *